United States Patent
Okuyama

(10) Patent No.: US 9,108,404 B2
(45) Date of Patent: Aug. 18, 2015

(54) INK JET RECORDING METHOD AND RECORDED MATTER

(71) Applicant: Seiko Epson Corporation, Tokyo (JP)

(72) Inventor: Tomoyuki Okuyama, Chino (JP)

(73) Assignee: Seiko Epson Corporation, Shiojiri-Shi (JP)

(*) Notice: Subject to any disclaimer, the term of this patent is extended or adjusted under 35 U.S.C. 154(b) by 0 days.

(21) Appl. No.: 14/220,476

(22) Filed: Mar. 20, 2014

(65) Prior Publication Data

US 2014/0287198 A1   Sep. 25, 2014

(30) Foreign Application Priority Data

Mar. 22, 2013  (JP) ................. 2013-059555

(51) Int. Cl.
*B41J 2/01*  (2006.01)
*B41J 2/135*  (2006.01)
*B41J 2/21*  (2006.01)

(52) U.S. Cl.
CPC ............... *B41J 2/135* (2013.01); *B41J 2/2107* (2013.01); *Y10T 428/24802* (2015.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/40; C09D 11/30; C09D 11/38; C09D 11/322; C09D 11/328; C09D 11/101; C09D 11/005; C09D 11/54; C09D 11/52; C09D 11/36; B41M 5/0011; B41M 5/0017; B41M 7/00
USPC ........... 347/100, 102, 101, 95, 96, 88, 99, 20, 347/21; 106/31.6, 31.13, 31.27
See application file for complete search history.

(56) References Cited

U.S. PATENT DOCUMENTS

| | | | |
|---|---|---|---|
| 5,609,671 A | 3/1997 | Nagasawa | |
| 6,830,612 B1 | 12/2004 | Yatake et al. | |
| 2010/0321430 A1* | 12/2010 | Koganehira et al. | 347/100 |

FOREIGN PATENT DOCUMENTS

| | | | | |
|---|---|---|---|---|
| EP | 2266812 A2 * | 12/2010 | ............. | B41M 7/009 |
| JP | 08-003498 A | 1/1996 | | |
| JP | 2001-187850 A | 7/2001 | | |
| JP | 2006-008470 A | 1/2006 | | |

* cited by examiner

*Primary Examiner* — Manish S Shah
(74) *Attorney, Agent, or Firm* — Nutter McClennen & Fish LLP; John J. Penny, Jr.

(57) ABSTRACT

An ink jet recording method includes discharging a first ink composition onto a recording medium using a recording head, in which the first ink composition includes a coloring material, an alkane diol with 4 or more to 8 or fewer carbon atoms, a water-soluble solvent, and water; the recording head discharges the first ink composition using a piezoelectric element, and has a resolution per unit length of 200 dpi or more, and the recording medium has an absorbing layer on the surface thereof, in which a nonpolar component of a surface free energy of the absorbing layer is 20 mN/m or lower.

6 Claims, 5 Drawing Sheets

INK JET RECORDING METHOD AND RECORDED MATTER

Priority is claimed under 35 U.S.C. §119 to Japanese Application No. 2013-059555 filed on Mar. 22 2013, is hereby incorporated by reference in its entirety.

BACKGROUND

1. Technical Field

The present invention relates to an ink jet recording method and a recorded matter.

2. Related Art

There is demand for an ink with a low viscosity in ink jet methods in which ink is discharged as minute droplets. On the other hand, because it is necessary to prevent bleeding of the ink on a recording medium, an ink jet ink that includes a penetrant is used (for example, refer to JP-A-2001-187850).

However, in the recording method used in the related art, it is difficult to form an image at high speeds while sufficiently preventing bleeding of the ink depending on the type of medium.

SUMMARY

An advantage of some aspects of the invention is to provide an ink jet recording method able to manufacture at high speeds a recording matter having a printing portion in which bleeding is prevented on a recording medium to which the ink composition is poorly compatible, and further to provide a recording matter having a printing portion in which bleeding is prevented and with a sufficient image density on a recording medium to which the ink composition is poorly compatible.

This advantage is achieved by the invention described below.

According to an aspect of the invention, there is provided an ink jet recording method including discharging a first ink composition onto a recording medium using a recording head, in which the first ink composition includes a coloring material, an alkane diol with 4 or more to 8 or fewer carbon atoms, a water-soluble solvent, and water; the recording head discharges the first ink composition using a piezoelectric element, and has a resolution per unit length of 200 dpi or more; and the recording medium has an absorbing layer on the surface thereof, in which a nonpolar component γsd of a surface free energy of the absorbing layer calculated using the following formulae (1) and (2) is 20 mN/m or lower, $$\gamma l_M(1+\cos\theta_M)=2(\gamma sd\cdot\gamma ld_M)^{0.5}+2(\gamma sp\cdot\gamma lp_M)^{0.5} \quad (1)$$

$$\gamma l_W(1+\cos\theta_W)=2(\gamma sd\cdot\gamma ld_W)^{0.5}+2(\gamma sp\cdot\gamma lp_W)^{0.5} \quad (2)$$

(where, in formulae (1) and (2), $\gamma ld_M$ represents a nonpolar component of a surface free energy of diiodomethane, $\gamma lp_M$ represents a polar component of a surface free energy of diiodomethane, $\gamma l_M$ represents a surface free energy of diiodomethane ($=\gamma ld+\gamma lp$), $\theta_M$ represents a contact angle of diiodomethane on the absorbing layer, $\gamma ld_W$ represents a nonpolar component of a surface free energy of water, $\gamma lp_W$ represents a polar component of a surface free energy of water, $\gamma l_W$ represents a surface free energy of water ($=\gamma ld+\gamma lp$), $\theta_W$ represents a contact angle of water on the absorbing layer, γsd represents a nonpolar component of a surface free energy of the absorbing layer, and γsp represents a polar component of a surface free energy of the absorbing layer).

In so doing, it is possible to provide an ink jet recording method in which a recording medium with a low nonpolar component of surface free energy is used, and which is able to manufacture at high speeds a recorded matter having a printing area in which bleeding is prevented.

In the ink jet recording method according to the aspect of the invention, it is preferable that a polar component of a surface free energy of the absorbing layer calculated with the formula (1) be 20 mN/m or lower.

In so doing, a recorded matter with a higher texture can be obtained, and favorable image recording can be performed even on such a recording medium if an ink composition of the present disclosure is used.

In the ink jet recording method according to the aspect of the invention, it is preferable that a second ink composition containing a coloring material with the same color as the first ink composition and in which the content rate of the coloring material is lower than the content rate of the color material in the first ink composition and including an alkane diol with 4 or more to 8 or fewer carbon atoms at a content rate of 1 mass % or higher to 10 mass % or lower be used along with the first ink composition.

In so doing, the gradation expression of the printing portion can be improved. In addition, it is possible for the first ink composition to have more satisfactory penetration into the recorded matter and more effectively prevent the occurrence of bleeding, and the image quality of the printing portion is improved.

In the ink jet recording method according to the aspect of the invention, it is preferable that the absorbing layer include a metal hydroxide.

In so doing, bleeding is prevented even with respect to a medium including the metal hydroxide, and an effect of providing a printed matter having a printing portion with a sufficient image density, and with a texture such as that of a picture (mural) drawn on plaster is obtained.

In the ink jet recording method according to the aspect of the invention, it is preferable that the recording head perform recording of an image using droplets of 20 pl or less.

In so doing, bleeding is prevented even with respect to a medium including the metal hydroxide, and a printed matter having a printing portion with a sufficient image density, and with a texture such as that of a picture (mural) drawn on plaster can be provided.

According to the aspect of the invention, it is preferable that the first ink composition include an alkylene glycol alkyl ether represented by the following formula (3),

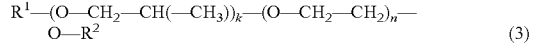

$$R^1-(O-CH_2-CH(-CH_3))_k-(O-CH_2-CH_2)_n-O-R^2 \quad (3)$$

(where, in formula (3), $R^1$ and $R^2$ each independently represent a hydrogen atom or an alkyl group with 1 or more to 4 or fewer carbon atoms, n is a number of 0 or higher and 3 or less, k is a number of 0 or higher and 3 or less, $R^1$ and $R^2$ are not hydrogen atoms at the same time, and n and k are not 0 at the same time).

In so doing, bleeding is prevented even with respect to a medium with a polar component γsp of 20 mN/m or less, and an effect of providing a printed matter having a printing portion with a sufficient image density, and with a texture such as that of a picture (mural) drawn on plaster is obtained.

In the ink jet recording method according to an aspect of the invention, it is preferable that the absorbing layer be provided on a base material, and have a cracking region that spans from the surface thereof to the base material.

In so doing, bleeding is effectively prevented, and a printed matter having a printing portion with a sufficient image density, and with a texture such as that of a picture (mural) drawn on plaster can be provided.

According to another aspect of the invention, there is provided a recorded matter manufactured using the ink jet recording method according to the aspect of the invention.

In so doing, a recorded matter in which a recording medium in which a nonpolar component of the surface free energy is low is used, and which has a printing portion in which bleeding is prevented can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
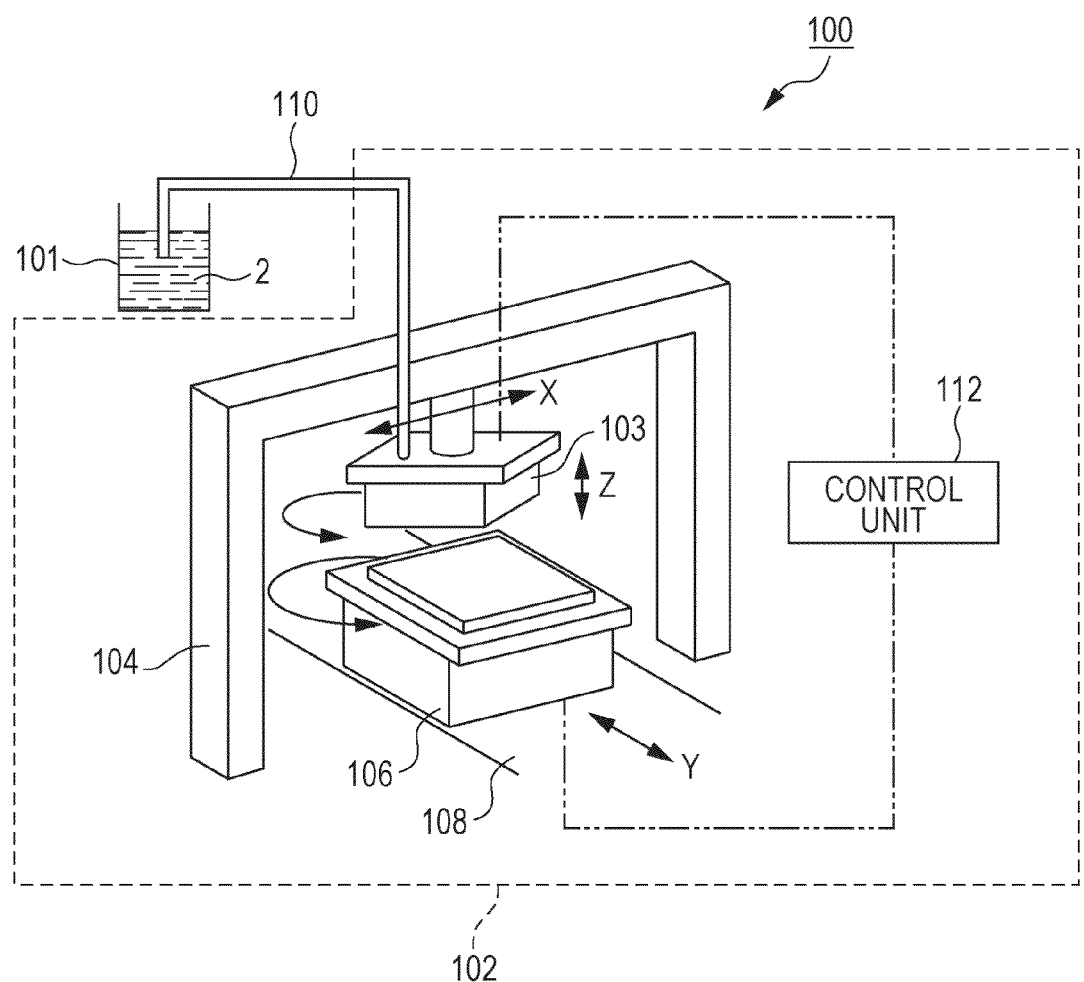
FIG. 1 is a perspective view showing an example of a droplet discharging apparatus used in manufacturing a recorded matter.

The preferred embodiments of the invention are described below.

Ink Jet Recording Method

Firstly, the ink jet recording method of the present disclosure will be described.

In the ink jet recording method of an aspect of the invention, a first ink composition including a coloring material, an alkane diol with 4 or more to 8 or fewer carbon atoms, a water-soluble solvent, and water is used as an ink composition discharged onto a recording medium from a recording head, in which since the recording head discharges the ink composition using a piezoelectric element, the recording head has a resolution per unit length of 200 dpi or more, the recording medium has an absorbing layer on the surface thereof, and a nonpolar component γsd of a surface free energy of the absorbing layer calculated using the following formulae (1) and (2) is 20 mN/m or lower, $$\gamma l_M(1+\cos\theta_M)=2(\gamma sd\cdot\gamma ld_M)^{0.5}+2(\gamma sp\cdot\gamma lp_M)^{0.5} \quad (1)$$

$$\gamma l_W(1+\cos\theta_W)=2(\gamma sd\cdot\gamma ld_W)^{0.5}+2(\gamma sp\cdot\gamma lp_W)^{0.5} \quad (2)$$

(where, in formulae (1) and (2), $\gamma ld_M$ represents a nonpolar component of a surface free energy of diiodomethane, $\gamma lp_M$ represents a polar component of a surface free energy of diiodomethane, $\gamma l_M$ represents a surface free energy of diiodomethane (=$\gamma ld+\gamma lp$), $\theta_M$ represents a contact angle of diiodomethane on the absorbing layer, $\gamma ld_W$ represents a nonpolar component of a surface free energy of water, $\gamma lp_W$ represents a polar component of a surface free energy of water, $\gamma l_W$ represents a surface free energy of water (=$\gamma ld+\gamma lp$), $\theta_W$ represents a contact angle of water on the absorbing layer, $\gamma sd$ represents a nonpolar component of a surface free energy of the absorbing layer, and $\gamma sp$ represents a polar component of a surface free energy of the absorbing layer).

Thus, according to the aspect of the invention, an ink composition that satisfies predetermined conditions and a recording medium that satisfies predetermined conditions are used in combination, along with using a high resolution recording head. Then, in so doing, bleeding is prevented, and in a case in which a specified absorbing layer is included, it is possible to manufacture at high speeds a recorded matter having a texture such as that of a picture (mural) drawn on plaster. Superior effects such as the above are obtained by satisfying all of the conditions, and in cases in which even one of the conditions is not satisfied, the superior effects such as the above are not obtained.

For example, in a case in which the first ink composition does not include an alkane diol with 4 or more to 8 or fewer carbon atoms, the ability of the first ink composition to penetrate to a recording medium that satisfies the above conditions is lowered, and problems of bleeding of ink on the recording medium and aggregation of the pigment arise.

In addition, in a case where the resolution per unit length of the recording head is 200 dpi or more, the ink composition may be ejected at a high density, and it is possible to form a satisfactory image on a recording medium in which the above-described bleeding and pigment aggregation easily occurs.

The above formula (1) is generally called the Owens-Wendt approximation, and the unit for any of $\gamma ld_W$, $\gamma lp_W$, $\gamma l_W$, $\gamma ld_M$, $\gamma lp_M$, $\gamma l_M$, $\gamma sd$, and $\gamma sp$ in formula (1) is mN/m.

The polar component γsp and the nonpolar component γsd of the absorbing layer may be obtained as below. That is, the contact angle after 100 ms from 1 μl of water and diiodomethane being dropped with respect to the absorbing layer is measured at room temperature (23° C.). Since the polar component and the nonpolar component of water and diiodomethane are known, from the two formulae that are a formula in which the value of water is used and a formula in which the value of diiodomethane is used, it is possible to calculate the polar component γsp and the nonpolar component γsd of the absorbing layer by solving the simultaneous equation. Moreover, the $\gamma ld_W$ of water is 48.5, $\gamma lp_W$ is 2.3, and $\gamma l_W$ is 50.8; the $\gamma ld_M$ of diiodomethane is 29.1, $\gamma lp_M$ is 43.7, and $\gamma l_M$ is 72.8.

Droplet Discharging Apparatus

Below, the droplet discharging apparatus used with the ink jet recording method of the present disclosure will be described.

According to the aspect of the invention, the recording head (droplet discharging head) uses a piezoelectric element, and the resolution per unit length is 200 dpi or more. When such a recording head is included and droplets of the first ink composition may be discharged with multiple sizes (for example, in a range of 1 pl to 40 pl), more preferable effects are obtained.

The resolution per unit length of the recording head may be 200 dpi or more; however, 300 dpi or more is preferable, and 600 dpi or more is more preferable. In so doing, minute droplets are recorded with a high density and at high speeds, and it is possible to form a satisfactory image even on a recording medium having a specified nonpolar component. Meanwhile, in a case where a recording head with a low resolution is used, there is a tendency for the printing speed to become slow if the droplet size is not increased; however, in a case where the droplet size is large, image quality deterioration, such as bleeding, becomes noticeable, and application to the above-described recording medium is difficult. On the other hand, slowing the printing speed is not preferable from the viewpoint of recorded matter productivity.

A recording head that performs image recording using droplets of 20 pl or less is preferable. That is, it is preferable that the volume of one droplet the recording head discharges be 20 pl or less, and 5 pl or more to 15 pl or less is more preferable. In so doing, it is possible to more reliably record a printing portion in which bleeding is prevented on a recording medium having a predetermined nonpolar component.

Below, an example of a droplet discharging apparatus using in manufacturing a recorded matter will be described.

Figure 2:
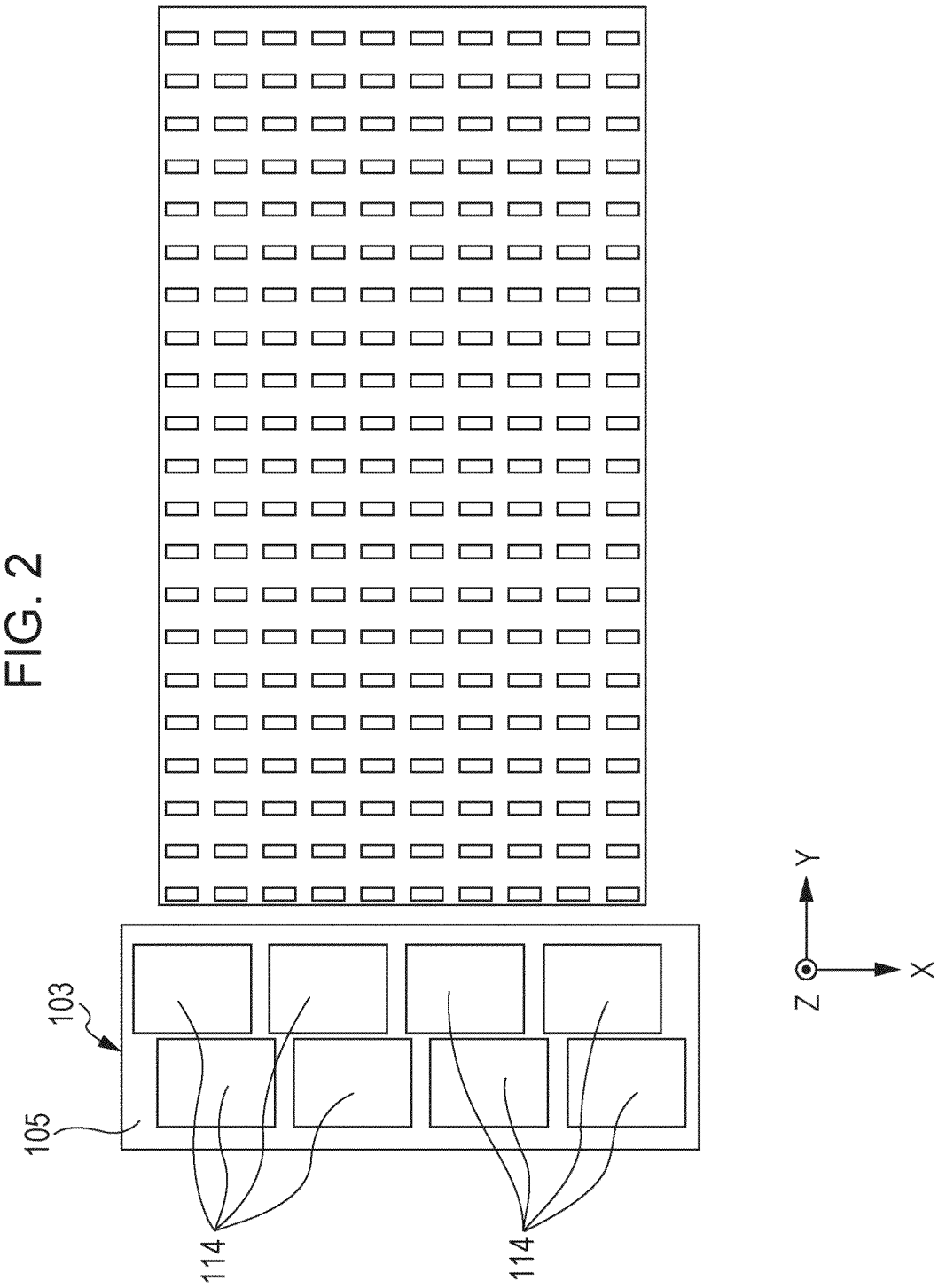
FIG. 2 is a diagram in which a droplet discharging unit in the droplet discharging apparatus shown in FIG. 1 is observed from the stage side.
Figure 3:
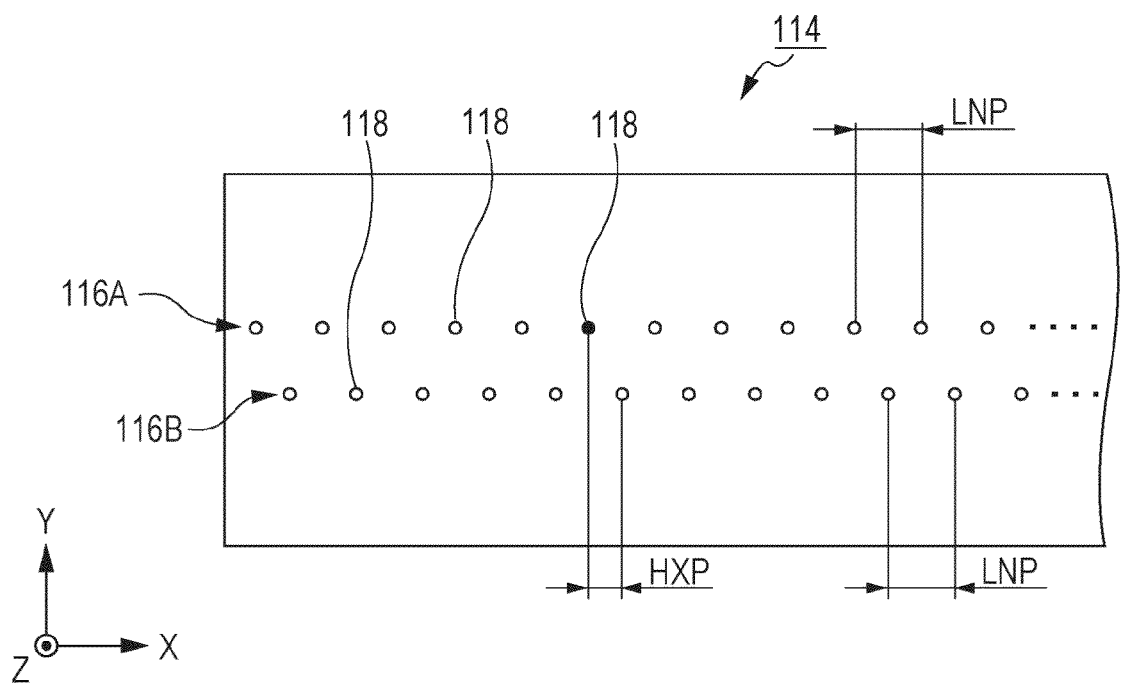
FIG. 3 is a diagram showing the bottom surface of a droplet discharging head in the droplet discharging apparatus shown in FIG. 1.
Figure 4A:
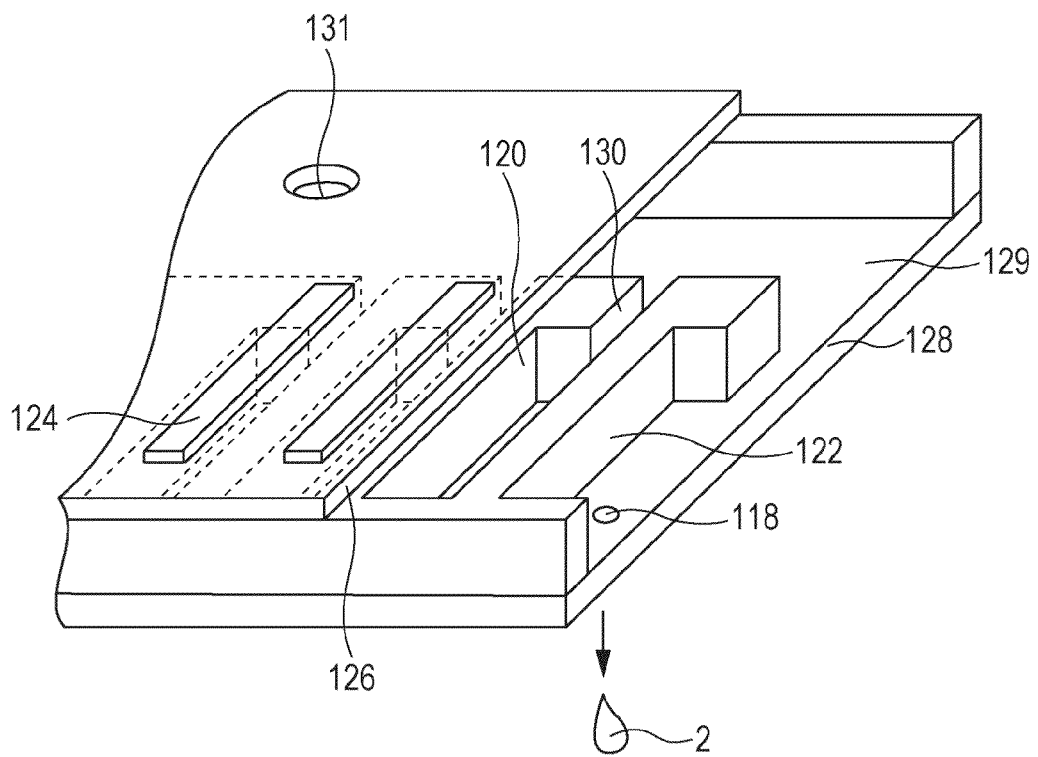
FIG. 4A is a cross-sectional perspective view showing a droplet discharging head in the droplet ejecting apparatus shown in FIG. 1.
Figure 4B:
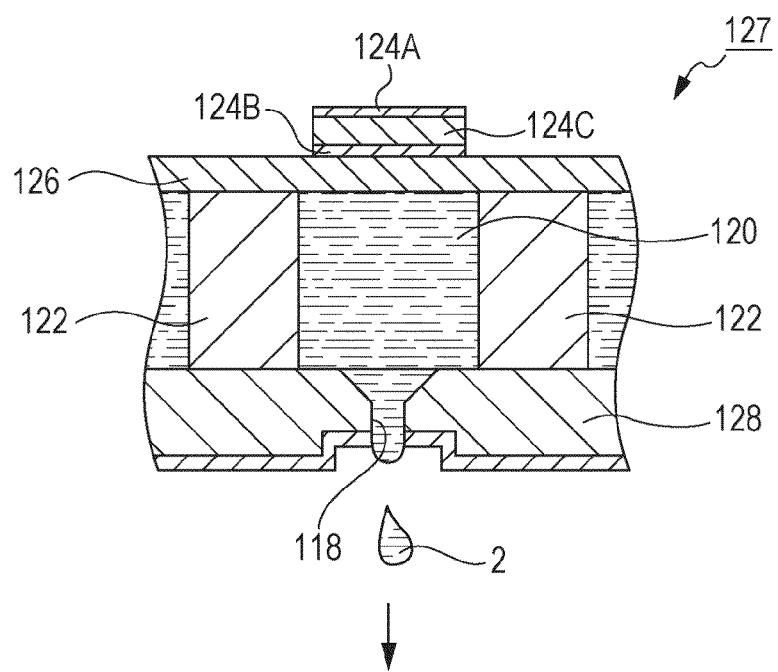
FIG. 4B is a cross-section view showing a droplet discharging head in the droplet ejecting apparatus shown in FIG. 1.

FIG. 1 is a perspective view showing an example of a droplet discharging apparatus used in manufacturing a recorded matter, FIG. 2 is a diagram in which a droplet discharging unit in the droplet discharging apparatus shown in FIG. 1 is observed from the stage side, FIG. 3 is a diagram showing the bottom surface of a droplet discharging head in the droplet discharging apparatus shown in FIG. 1, FIG. 4A is a cross-sectional perspective view showing a droplet discharging head in the droplet ejecting apparatus shown in FIG. 1, and FIG. 4B is a cross-section view showing a droplet discharging head in the droplet ejecting apparatus shown in FIG. 1.

As shown in FIG. 1, the droplet discharging apparatus 100 used in discharging ink includes a tank 101 that holds an ink composition 2, a tube (liquid delivery tube) 110 that supplies the ink composition 2 in the tank 101, and a discharge scanning portion 102 to which the ink composition 2 is supplied from the tank 101 via the tube 110. The discharge scanning portion 102 includes a droplet discharging unit 103 in which a plurality of droplet discharging heads (recording heads) 114 are mounted on a carriage 105, a first position control device 104 (movement unit) that controls the position of the droplet discharging unit 103, a stage 106 that holds the recording medium 50, a second position control device 108 (movement unit) that controls the position of the stage 106, and a control unit 112. The tank 101 and the plurality of droplet discharging heads 114 in the droplet discharging unit 103 are connected by the tube 110, and the ink composition 2 is supplied from the tank 101 to each of the plurality of droplet discharging heads 114 by compressed air.

The first position control device 104 causes the droplet discharging unit 103 to move along the Z-axis direction orthogonal to the X-axis direction and the X-axis direction according to a signal from the control unit 112. Furthermore, the first position control device 104 has a function in which the droplet discharging unit 103 is rotated around an axis parallel to the Z-axis. In the present embodiment, the Z-axis direction is the direction parallel to the vertical direction (in other words, the direction of gravitational acceleration). The second position control device 108 causes the stage 106 to move along the Y-axis direction orthogonal to both the X-axis direction and the Z-axis direction according to a signal from the control unit 112. Furthermore, the second position control device 108 has a function in which the stage 106 is rotated around an axis parallel to the Z-axis.

The stage 106 has a flat surface parallel to both the X-axis direction and the Y-axis direction. In addition, the stage 106 is configured so as to be able to fix or hold a recording medium 50 on which the ink composition 2 is to be applied on the flat surface thereof.

As above, the droplet discharging unit 103 is moved in the X-axis direction by the first position control device 104. Meanwhile, the stage 106 is moved in the Y-axis direction by the second position control device 108. In other words, the relative position of the droplet discharging head 114 changes with respect to the stage 106 (the recording medium 50 held on the stage 106 and the droplet discharging unit 103 move relatively) due to the first position control device 104 and the second position control device 108.

The control unit 112 is configured so as to receive from an external information processing apparatus discharge data representing the relative positions at which the ink composition 2 should be discharged.

As shown in FIG. 2, the droplet discharging unit 103 has a plurality of droplet discharging heads 114 each having the same structure, and a carriage 105 that holds the droplet discharging heads 114. In the present embodiment, there are eight droplet discharging heads 114 held by the droplet discharging unit 103. Each of the droplet discharging heads 114 has a bottom surface in which a plurality of nozzles 118 described later is provided. The shape of bottom surface of each of the droplet discharging heads 114 is a polygon having two long sides and two short sides. The bottom surfaces of the droplet discharging heads 114 held in the droplet discharging unit 103 face the stage 106 side, and, furthermore, the long side direction and the short side direction of the droplet discharging heads 114 are parallel to the X-axis direction and the Y-axis direction, respectively.

As shown in FIG. 3, the droplet discharging head 114 has a plurality of nozzles 118 lined up in the X-axis direction. This plurality of nozzles 118 is arranged such that the nozzle pitch HXP in the X-axis direction in the droplet discharging head 114 has a predetermined value. The specific value of the nozzle pitch HXP is not particularly limited; however, the pitch may be set to 50 μm to 90 μm, for example. Here, the "nozzle pitch HXP in the X-axis direction in the droplet discharging head 114" corresponds to the pitch between the plurality of nozzle images obtained by mapping on the X-axis all of the nozzles 118 in the droplet discharging head 114 along the Y-axis direction.

In the present embodiment, the plurality of nozzles 118 in the droplet discharging head 114 is formed of a nozzle row 116A and nozzle row 116B both extending in the X-axis direction. The nozzle row 116A and the nozzle row 116B are arranged in parallel with a gap therebetween. Then, in the present embodiment, in each of the nozzle row 116A and the nozzle row 116B, 90 nozzles 118 are lined up in a row in the X-axis direction with a predetermined interval LNP. The specific value of the LNP is not particularly limited; however, the value may be set to 100 μm or higher to 180 μm or lower.

The position of the nozzle row 116B is shifted with respect to the position of the nozzle row 116A in the forward direction (the right direction in FIG. 3) of the X-axis direction by half the length of the nozzle pitch LNP. Thereby, the nozzle pitch HXP in the X-axis direction of the droplet discharging head 114 is half the length of the nozzle pitch LNP of the nozzle row 116A (or nozzle row 116B).

Accordingly, the nozzle line density in the X-axis direction of the droplet discharging head 114 is twice the nozzle line density of the nozzle row 116A (or nozzle row 116B). Moreover, the "nozzle line density in the X-axis direction" in the present specification corresponds to the number per unit length of the plurality of nozzle images obtained by mapping on the X-axis direction the plurality of nozzles along the Y-axis direction. Naturally, the number of nozzle rows the droplet discharging head 114 includes is not limited to only two. The droplet discharging head 114 may include M nozzle rows. Here, M is a natural number of 1 or higher. In this case, the plurality of nozzles 118 in each of the M nozzle rows are lined up at a pitch of M times the length of the nozzle pitch HXP. Furthermore, in a case in which M is a natural number of 2 or more, with respect to one of the M nozzle rows, the other (M−1) nozzle rows are shifted in the X-axis direction without overlapping by i times the length of the nozzle pitch HXP. Here, i is a natural number of 1 to (M−1).

Here, in the present embodiment, because the nozzle row 116A and the nozzle row 116B are each formed from 90 nozzles 118, one droplet discharging head 114 has 180 nozzles 118. Here, 5 nozzles each at both ends of the nozzle row 116A are set as "rest nozzles". Similarly, the 5 nozzles each at both ends of the nozzle row 116B are also set as "rest nozzles". Thus, the ink composition 2 is not discharged from these 20 "rest nozzles". Therefore, 160 nozzles 118 from the 180 nozzles 118 in the droplet discharging head 114 function as nozzles discharging the ink composition 2.

As shown in FIG. 2, a plurality of the droplet discharging heads 114 are arranged in two rows along the X-axis direction in the droplet discharging unit 103. Taking the rest nozzle portion into consideration, one row of the droplet discharging heads 114 and the other row of droplet discharging heads 114 are arranged so as to partially overlap when viewed from the Y-axis direction. In so doing, the droplet discharging unit 103 configured so as to cross the length of the dimension of the recording medium 50 in the X-axis direction, and the nozzles 118 that discharge the ink composition 2 are continuous in the X-axis direction with the nozzle pitch HXP.

In the droplet discharging unit 103 of the present embodiment, although the droplet discharging head 114 is arranged so as to cover the entire length of the dimension of the recording medium 50 in the X-axis direction, the droplet discharging unit according to an aspect of the invention may cover a part of the length of the dimension of the recording medium 50 in the X-axis direction.

As shown in the drawing, each of the droplet discharging heads 114 is an ink jet head. More specifically, each of the droplet discharging head 114 includes a diaphragm 126 and a nozzle plate 128. A liquid reservoir 129 normally filled with the ink composition 2 supplied from the tank 101 via a hole 131 is positioned between the diaphragm 126 and the nozzle plate 128.

In addition, a plurality of dividing walls 122 is positioned between the diaphragm 126 and the nozzle plate 128. Then, a part surrounded by the diaphragm 126, the nozzle plate 128, and a pair of dividing walls 122 is a cavity 120. Because the cavities 120 are provided corresponding to the nozzles 118, the number of cavities 120 is the same as the number of nozzles 118. The ink composition 2 is supplied to the cavity 120 from the liquid reservoir 129 via a supply port 130 positioned between the pair of dividing walls 122.

An oscillator 124 is positioned on the diaphragm 126 corresponding to each of the cavities 120. The oscillator 124 includes a piezoelectric element 124C and a pair of electrodes 124A and 124B interposing the piezoelectric element 124C. By providing a driving voltage between the pair of electrodes 124A and 124B, the ink composition 2 is discharged from the corresponding nozzle 118. Moreover, the shape of the nozzle 118 is adjusted such that the ink composition 2 is discharged from the nozzle 118 in the Z-axis direction.

The control unit 112 (refer to FIG. 1) is preferably configured so as to provide mutually independent signals to each of the plurality of oscillator 124. In other words, the volume of the ink composition 2 discharged from the nozzle 118 is preferably controlled for each nozzle 118 according to a signal from the control unit 112. In addition, the control unit 112 is able to set a nozzle 118 that performed a discharge operation between coating and scanning, and a nozzle 118 that does not perform a discharge operation.

In the present specification, a part in which one nozzle 118, a cavity 120 corresponding to the nozzle 118, and an oscillator 124 corresponding to the cavity 120 are included are denoted by "discharge portion 127". According to this denotation, one droplet discharging head 114 has the same number of discharge portions 127 as the number of nozzle 118.

By using an apparatus such as above, it is possible to apply the ink composition 2 to a desired location with superior positional accuracy and at high speeds. Moreover, in the configuration shown in the drawings, the droplet discharging apparatus 100 has only a tank 101 that holds the ink composition 2, tube 110 or the like for one type of ink composition; however, such members are preferably included for the number types of ink compositions. In addition, in manufacturing of a recorded matter, a plurality of droplet discharging apparatuses 100 is preferably used so as to correspond to a plurality of types of ink composition. In this case, the configuration of each of the droplet discharging apparatuses may be the same or may be different from one another.

First Ink Composition

The first ink composition includes a coloring material, an alkane diol with 4 or more to 8 or fewer carbon atoms, a water-soluble solvent, and water.

Coloring Material (Coloring Agent)

Although, for example, various pigments, various dyes and the like may be used as the coloring material (coloring agent), a pigment is preferable. The light resistance of the recorded matter may be made particularly superior by using a pigment. Representative pigments are described below.

Examples of a black pigment include, for example, carbon black.

Examples of the magenta pigment include, for example, C.I. Pigment Red 1 (Para Red), 2, 3 (Toluidine Red), 5 (ITR Red), 7, 9, 10, 11, 12, 17, 30, 31, 38 (Pyrazolone Red), 42, 48 (Ca), 48 (Mn), 57 (Ca), 57:1, 88 (thioindigo), 112 (Naphthol AS-based), 122 (dimethylquinacridone), 123, 144, 149, 150, 166, 168 (Anthanthrone Orange), 170 (Naphthol AS-based), 171, 175, 176, 177, 178, 179 (Perylene Maroon), 184, 185, 187, 202, 209 (dichloroquinacridone), 219, 224 (perylene-based), 245 (Naphthol AS-based), C.I. Pigment Violet 19 (quinacridone), 23 (Dioxazine Violet), 32, 33, 36, 38, 43, 50, and solid solutions of quinacridone pigments, and one or more thereof may be used. Among these, quinacridone-based pigments or solid solutions thereof, such as C.I. Pigment Red 122, 202, 209, and C.I. Pigment Violet 19, are preferable.

Examples of the cyan pigment include, for example, C.I. Pigment Blue 1, 2, 3, 15, 15:1, 15:2, 15:3, 15:4, 16 (metal-free phthalocyanine), 18 (Alkali Blue toner), 22, 25, 60 (Threne Blue), 65 (violanthrone), and 66 (indigo), and one or more types thereof may be used. Among these, phthalocyanine-based pigments such as C.I. Pigment Blue 15, 15:1, 15:2, 15:3, 15:4 and 16 are preferable.

Examples of the yellow pigment include C.I. Pigment Yellow 1 (Hanza Yellow), 2, 3, 12, 13, 14, 16, 17, 24 (Fravanthrone Yellow), 34, 35, 37, 53, 55, 65, 73, 74, 75, 81, 83 (Diarylide Yellow), 93, 94, 95, 97, 98, 99, 108 (Anthrapyrimidine Yellow), 109, 110, 111, 113, 114, 117 (copper complex salt pigment), 120, 128, 129, 133 (quinophthalone), 138, 139 (isoindolinone), 147, 150, 151, 153 (nickel complex pigment), 154, 155, 167, 172, 180, 185, 213, and pigments described in International Publication No. WO 2011/027842. Among these, C.I. Pigment Yellow 74, 128, 129, 155, 180, 185, 213, and pigments described in International Publication No. WO 2011/027842 are preferable.

In particular, among the pigments, use of resin dispersed pigments or self-dispersion pigments is preferable, and self-dispersion pigments are more preferable. Because self-dispersion pigments easily aggregate on a recording medium described in detail later compared to other coloring materials, self-dispersion pigments have an advantage in increased optical density (image density) of the printing portion formed using the ink composition. In addition, because the density of the ink composition is easily adjusted in an appropriate range by using the self-dispersion pigment, handling is easy. In addition, the self-dispersion pigment may be uniformly dispersed in the ink composition even without separately blending with a dispersant. Moreover, the term "disperse" herein, refers to a state in which the self-dispersion pigment is stably present in a dispersion medium without a dispersant, and is not only a state of being dispersed, but also includes a state of being dissolved. Since the ink composition with which the self-dispersion pigment is blended has high dispersion stability, and further, suitable ink composition density compared to an ordinary ink composition in which a pigment other than a self-dispersion pigment and a dispersant are blended, there is an advantage of being able to contain more of the pigment, and forming an image with particularly superior chromagenicity.

Moreover, in the aspect of the invention, a self-dispersion pigment refers to a surface modified pigment in which one or two or more functional groups selected from a group composed of a carbonyl group, a carboxyl group, an aldehyde group, a hydroxyl group, a sulfone group, an amino group and salts thereof, are bonded directly or indirectly via an alkyl group, an aryl group or the like on the surface thereof.

In preparing the self-dispersion pigment, the pigment may obtained by a functional group or molecule including the functional group being coordinated in the surface of the pigment, forming a chemical bond, such as grafting, using a physical process such as vacuum plasma, or a chemical process. For example, the self-dispersion pigment may be obtained with the method disclosed in JP-A-8-3498. In addition, a commercially-available product may be used as the self-dispersion pigment, and, for example, "Microjet CW1", and "Microjet CW2" manufactured by Orient Chemical Industries Co., Ltd., and "CAB-O-JET 200" and "CAB-O-JET 300" manufactured by Cabot Corporation or the like may be used.

Below, a specific example of the preparation method of the self-dispersion pigment will be described.

First, a pigment (not a self-dispersion pigment, pigment before surface modification) is added to a solvent, and a slurry-like pigment dispersion liquid is obtained by high speed sheer dispersion with a high speed mixer or shock dispersion with a bead mill or a jet mill. While the pigment dispersion liquid is slowly stirred, a processing agent including sulfur (such as sulfamic acid, fuming sulfuric acid, sulfuric acid, chlorosulfuric acid, fluorosulfuric acid, or amidesulphuric acid) is added, the pigment dispersion liquid is heat treated at 60° C. or higher to 200° C. or less, and a dispersibility-imparting group is introduced to the pigment surface. After the solvent is removed from the pigment dispersion liquid, the processing agent including sulfur is removed by repeating rinsing with water, ultrafiltration, reverse osmosis, centrifugation, filtering or the like, and a self-dispersion pigment is obtained.

Examples of the resin dispersant used in the resin dispersed pigment include polyvinyl alcohols, polyacrylic acid, acrylic acid-acrylonitrile copolymers, vinyl acetate-acrylic acid ester copolymers, acrylic acid-acrylic acid ester copolymers, styrene-acrylic acid copolymers, styrene-methacrylic acid copolymers, styrene-methacrylic acid-acrylic acid ester copolymers, styrene-α-methylstyrene-acrylic acid copolymers, styrene-α-methylstyrene-acrylic acid-acrylic acid ester copolymers, styrene-maleic acid copolymers, styrene-maleic anhydride copolymers, vinyl naphthalene-acrylic acid copolymers, vinyl naphthalene-maleic acid copolymers, vinyl acetate-maleic acid ester copolymers, vinyl acetate-crotonic acid copolymers, vinyl acetate-acrylic acid copolymers, and salts thereof. Among these, a copolymer of a monomer having a hydrophobic functional group and a monomer having a hydrophilic functional group, and a polymer formed from monomers having both a hydrophobic functional group and a hydrophilic functional group are preferable. It is possible to use any form of a random copolymer, a block copolymer, an alternating copolymer, and a graft copolymer as the form of the copolymer.

It is preferable that the molecular weight of the resin dispersant be in a range of 1,000 or higher to 100,000 or less as a weight average molecular weight, and a range of 3,000 or higher to 10,000 or lower is more preferable. By the molecular weight being in the above range, the pigment is stably dispersed in water, and further control of the viscosity and the like are easily performed when applied to the ink composition.

It is preferable that the addition amount of the resin dispersant with respect to the pigment be 10 parts by mass or more to 90 parts by mass or less with respect to 100 parts by mass of the pigment, and 30 parts by mass or more to 80 parts by mass or less is more preferable. By being in this range, the dispersion stability of the pigment in water is further improved.

Moreover, the pigment used in the resin dispersed pigment may be used similarly to the above-described self-dispersion pigment.

It is preferable that the average particle size of the pigment be 10 nm or more to 300 nm or less, and 40 nm or more to 150 nm or less is more preferable. In so doing, it is possible to obtain particularly superior storage stability for the ink composition and discharge stability using an ink jet method.

Moreover, in the present specification, the average particle size refers to the standard volume average particle size. The average particle size may be calculated, for example, by measurement using a particle size analyzer (Microtrac UPA, manufactured by Nikkiso Co., Ltd.).

It is preferable that the content rate of the coloring material in the first ink composition be from 2 mass % or more to 7 mass % or less, and 4 mass % or more to 6 mass % or less is more preferable. When the content rate of the coloring material is a value in this range, it is possible for both discharge stability using an ink jet method and image density in the printing portion to be at a higher level. Moreover, in a case in which the first ink composition includes a plurality of types of coloring material, it is preferable that the sum total of these content rates be included in these ranges.

Alkane Diol

The first ink composition includes an alkane diol with 4 or more to 8 or fewer carbon atoms. By including such an alkane diol, bleeding is prevented and it is possible to provide a recorded matter having a texture on a recording medium with which the ink is poorly compatible.

Examples of the alkane diol with 4 or more to 8 or fewer carbon atoms include, for example, 1,2-butanediol, 1,2-pentanediol, 1,2-hexanediol, 1,2-heptanediol, or 1,2-octanediol; however, among these, 1,2-pentanediol and 1,2-hexanediol are particularly preferable, and 1,2-hexanediol is most preferable. In so doing, the above-described effects are more remarkably exhibited.

It is preferable that the content rate of the alkane diol in the first ink composition be 1 mass % or more to 10 mass % or less, 2 mass % or more to 7 mass % or less is more preferable, and 4 mass % or more to 7 mass % or less is still more preferable. Because the lipophilicity improves by including the alkane diol, it is thought that the ability to penetrate media with a low nonpolar component improves. It is assumed that improvement of the lipophilicity of the one alkylene glycol alkyl ether is low and the ability to penetrate a recording medium with a low nonpolar component is low. By including the alkane diol, bleeding is prevented, and the effect is obtained of being able to provide a recording material with texture in which bleeding is more reliably prevented with respect to a recording medium with poor compatibility with ink. In contrast, when the content rate of the alkane diol is less than the lower limit value, there is a possibility of the problem of bleeding of the ink on the medium and aggregation of the pigment occurring. In addition, when the content rate of the alkane diol exceeds the upper limit value, the tendency for the discharge stability of the first ink composition using an ink jet method to lower becomes remarkable. Moreover, in a case in which the first ink composition includes a plurality of types of alkane diol, it is preferable that the sum total of these content rates be included in these ranges.

Water-Soluble Solvent

The first ink composition includes a water-soluble solvent. In so doing, drying of the ink in the head is suppressed and an effect in which the reliability may be improved is obtained.

Moreover, in the aspect of the invention, it is possible to use a water-soluble solvent other than an alkane diol with 4 or more to 8 or fewer carbon atoms as the water-soluble solvent, and examples include, for example, glycerin, diethylene glycol, triethylene glycol, tetraethylene glycol, hexaethylene glycol, propylene glycol, dipropylene glycol, 1,3-propanediol, 1,4-butanediol, 1,5-pentanediol, 1,6-hexanediol, 3-methyl-1,3-butanediol, 2-methyl-1,3-propanediol, 3-methyl-1,5-pentanediol, 2-pyrrolidone, and N-methyl pyrrolidone.

Among these, a first ink composition including an alkylene glycol alkyl ether represented by the following formula (3) is preferable,

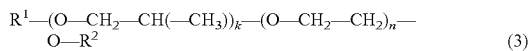

$$R^1-(O-CH_2-CH(-CH_3))_k-(O-CH_2-CH_2)_n-O-R^2 \quad (3)$$

(where, in formula (3), $R^1$ and $R^2$ each independently represent a hydrogen atom or an alkyl group with 1 or more to 4 or fewer carbon atoms, n is a number of 0 or higher and 3 or less, k is a number of 0 or higher and 3 or less, $R^1$ and $R^2$ are not hydrogen atoms at the same time, and n and k are not 0 at the same time).

In so doing, the permeability of the first ink composition to the recording medium described in detail later is particularly superior, and it is possible to more effectively prevent the occurrence of bleeding in the printing portion.

Although examples of the alkylene glycol alkyl ether represented by (2), include, for example, diethylene glycol monomethyl ether, diethylene glycol dimethyl ether, diethylene glycol methyl ethyl ether, diethylene glycol mono ethyl ether, diethylene glycol diethyl ether, diethylene glycol mono-n-butyl ether, diethylene glycol di-n-butyl ether, diethylene glycol butyl methyl ether, dipropylene glycol monomethyl ether, dipropylene glycol mono-propyl ether, dipropylene glycol monoethyl ether, triethylene glycol monomethyl ether, triethylene glycol monobutyl ether, tetraethylene glycol monobutyl ether, tripropylene glycol monobutyl ether, tetraethylene glycol monomethyl ether, pentaethylene glycol monomethyl ether, pentaethylene glycol monobutyl ether, hexaethylene glycol monomethyl ether, and, tetra ethylene glycol dimethyl ether, among these, diethylene glycol mono-n-butyl ether, dipropylene glycol mono-propyl ether, triethylene glycol monobutyl ether, tetraethylene glycol monobutyl ether, pentaethylene glycol monobutyl ether are particularly preferable. In so doing, the above-described effects are more remarkably exhibited.

It is preferable that the content rate of the water-soluble solvent in the first ink composition be from 5 mass % or more to 30 mass % or less, and 10 mass % or more to 27 mass % or less is more preferable. In so doing, drying of the ink in the head is suppressed and an effect in which the reliability may be improved is obtained. In contrast, when the content rate of the water-soluble solvent is less than the lower limit value, there is a possibility of the problem of ink drying in the head and becoming unable to be discharged, the weight of the droplets discharged being unstable or the landing position shifting occurring. In addition, when the content rate of the water-soluble solvent exceeds the upper limit value, the tendency for the discharge stability using an ink jet method of the first ink composition to lower becomes remarkable. Moreover, in a case in which the first ink composition includes a plurality of types of water-soluble solvent, it is preferable that the sum total of these content rates be included in these ranges.

Water

The first ink composition includes water. In so doing, the ink is able to be more suitably dried after being applied on the medium along with superior discharge stability being possible. In addition, in a case in which the first ink composition includes a pigment (in particular, a self-dispersion pigment), it is possible for the dispersion stability of the pigment in the first ink composition, and the storage stability of the first ink composition to be particularly superior.

It is preferable that the content rate of water in the first ink composition be from 40 mass % or more to 80 mass % or less, and 50 mass % or more to 75 mass % or less is more preferable. In so doing, it is possible for the image density of the printing portion formed using the first ink composition to be particularly high while the storage stability and discharge stability and the like of the first ink composition are particularly superior. In contrast, when the content rate of the water is less than the lower limit value, a tendency for the storage stability and discharge stability of the first ink composition to lower appears. In addition, when the content rate of water exceeds the upper limit value, there is a possibility of difficulty in the image density of the printing portion formed being high according to the type or the like of the coloring material.

Other Components

The first ink composition may include components (other components) other than described above.

Examples of such components include, for example, resin materials such as styrene-acrylic copolymers, styrene-butadiene copolymers, urethane resins, polycarbonates, and polyesters; hydrocarbon waxes such as ozokerite, cercine, paraffin wax, micro wax, microcrystalline wax, petrolatum, and Fischer-Tropsch wax; ester waxes such as carnauba wax, rice wax, methyl laurate, methyl myristate, methyl palmitate, methyl stearate, butyl stearate, candelilla wax, cotton wax, japan wax, beeswax, lanolin, montan wax, fatty acid ester, and polyglycerol fatty acid esters; olefin waxes such as polyethylene wax, polypropylene wax, oxidized polyethylene wax, and oxidized polypropylene wax; amide-based waxes such as 12-hydroxy stearic acid amide, stearic acid amide, and phthalic anhydride imide, ketone waxes such as laurone, and stearone, waxes such as an ether-based wax, dispersants, antiseptic mildew-proofing agents, pH adjusters, chelating agents, rust inhibitors, ultraviolet absorbers, anti-foaming agents, surface tension-adjusting agents, polysiloxane compounds, and acetylene glycol compounds.

Examples of the antiseptic mildew-proofing agent, for example, organic sulfur-based, organic nitrogen sulfide-based, organic halogen-based, halo allyl sulfone-based, iodopropargyl-based, N-haloalkylthio-based, benzothiazole-based, nitrile-based, pyridine-based, 8-oxyquinoline-based, isothiazolin-based, dithiol-based, pyridine oxide-based, nitropropane-based, organotin-based, phenol-based, quaternary ammonium salt-based, triazine-based, thiadiazine-based, anilide-based, adamantane-based, dithiocarbamate-based, brominated indanone-based, benzyl bromoacetate-based, and inorganic salt-based compounds. Examples of the organic halogen-based compound include, for example, pentachlorophenol sodium, examples of the pyridine oxide-based compound include, for example, sodium pyridinethion-1-oxide, and zinc pyridine thione-1-oxide, and examples of the isothiazolin-based compounds include, for example, an amine salt of 1-benzisothiazolin-3-one, 1,2-benzisothiazoline-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, and 2-methyl-4-isothiazolin-3-one calcium chloride. Examples of other antiseptic mildew-proofing agents include sodium dehydroacetic acid, sodium sorbate, and sodium benzoate.

By the first ink composition including a pH adjuster, it is possible for the storage stability and the like of the first ink composition to be particularly superior. In addition, it is possible for the reliability of a recorded matter manufactured using the first ink composition to be particularly superior.

Examples of the pH adjuster include, for example, alkanolamine such as diethanolamine, triethanolamine, triisopropanolamine, and dimethyl ethanol amine; alkali metal hydroxides such as lithium hydroxide, sodium hydroxide, potassium hydroxide, and lithium hydroxide; ammonium hydroxide; alkali metal carbonates such as lithium carbonate, sodium carbonate, and potassium carbonate; and amino sulfonates such as taurine.

Examples of the chelating agent include, for example, disodiumethylenediamine tetraacetate, sodium nitrilotriacetate, sodium hydroxyethylethylenediamine triacetate, sodium diethylenetriamine pentaacetate, and sodium uracil diacetate.

Examples of the rust inhibitor include, for example, acid sulfites, sodium thiosulfate, ammonium thioglycolate, diisopropylammonium nitrite, pentaerythritol tetranitrate, dicyclohexylammonium nitrite and benzotriazole-based compounds.

Examples of the ultraviolet-absorbing agent, for example, include benzophenone-based compounds, cinnamic acid-based compounds, triazine-based compounds, stilbene-based compounds, and so-called fluorescent brightening agents (compounds that generate fluorescent light by absorbing ultraviolet rays represented by benzoxazole-based compounds).

Examples of anti-foaming agent include, for example, highly oxidized oil-based compounds, glycerol fatty acid ester-based compounds, fluorine-based compounds, silicone-based compounds, and acetylene-based compounds.

Examples of the surface tension-adjusting agents include, for example, anionic, amphoteric, cationic, and nonionic surfactants.

Examples of the anionic surfactant include, for example, alkylsulfocarboxylate, α-olefin sulfonate, polyoxyethylene alkyl ether acetate, N-acyl amino acid and its salts, N-acyl methyl taurine salt, alkyl sulfate polyoxyethylene alkyl ether sulfate, alkyl sulfates, polyoxyethylene alkyl ether phosphate, rosin acid soap, castor oil sulfate, lauryl alcohol sulfuric acid ester salt, alkylphenol type phosphoric acid ester, alkyl phosphate ester, alkyl aryl sulfonate, diethyl sulfosuccinate, diethyl hexyl sulfosuccinate, and dioctyl sulfosuccinate.

Examples of the amphoteric surfactant include, for example, lauryldimethylaminoacetic acid betaine, 2-alkyl-N-carboxymethyl-N-hydroxyethyl imidazolinium betaine, coconut oil fatty acid amide propyl dimethylamino acetic acid betaine, polyoctylpolyaminoethylglycine, and other imidazoline derivatives.

Examples of the cationic surfactant include, for example, a 2-vinyl pyridine derivative and a poly-4-vinyl pyridine derivative.

Examples of the nonionic surfactant include, for example, ether-based surfactants such as polyoxyethylene nonylphenyl ether, polyoxyethylene octyl phenyl ether, polyoxyethylene dodecyl phenyl ether, polyoxyethylene oleyl ether, polyoxyethylene lauryl ether, and polyoxyethylene alkyl ether; ester-based surfactants such as polyoxyethylene oleic acid ester, polyoxyethylene distearate ester, sorbitan laurate, sorbitan monostearate, sorbitan monooleate, sorbitan sesquioleate, polyoxyethylene monooleate, and polyoxyethylene stearate; and acetylene glycol (alcohol)-based surfactants such as 2,4,7,9-tetramethyl-5-decyne-4,7-diol, 3,6-dimethyl-4-octyne-3,6-diol, and 3,5-dimethyl-1-hexyne-3-ol.

It is preferable that the viscosity (viscosity at 25° C.) of the first ink composition be from 2 mPa·s or more to 20 mPa·s or less. In so doing, it is possible for the discharge stability of the first ink composition (such as stability of discharge amount, flight characteristics of droplets), discharge responsiveness (such as response speed, high frequency correspondence (frequency response characteristics)) to be particularly superior. Moreover, the viscosity may be obtained through JIS Z8809 compliant measurement using a vibration-type viscometer.

In the ink jet recording method of the aspect of the invention, a plurality of types of first ink composition is preferably used. For example, a plurality of types of first ink composition with different colors (plurality of types of first ink composition for which the type of coloring material contained is different) is preferably used.

Second Ink Composition

In the ink jet recording method of the aspect of the invention, it is preferable to include another ink composition (second ink composition) in addition to the above-described first ink composition.

It is preferable that a second ink composition that contains a coloring material with the same color as the above-described first ink composition, for which the content rate of the coloring material is lower than the content rate of the coloring material in the first ink composition, and includes an alkane diol with 4 or more to 8 or fewer carbon atoms at a content rate of 2 mass % or more to 10 mass % or less be used. In so doing, the gradation expression of the printing portion may be improved. In addition, the penetrant included in the second ink composition is able to more suitably penetrate the recording medium of the first ink composition, able to more effectively prevent the occurrence of bleeding, and the image quality of the printed portion of a medium poorly compatible with the above-described ink composition improves. In a case in which such a second ink composition is included, there are cases in which an image is formed using the first ink composition and the second composition together, which is preferable. In so doing, the effect in which bleeding is prevented, the printed portion has sufficient image density, and a recorded matter with a texture such as that of a picture (mural) drawn on plaster is provided is obtained. Moreover, the term "same color" does not signify completely the same color, and relates to colors with the same name under commonly accepted norms (for example, cyan, yellow, magenta, and black) in cases in which the coloring material is contained with the same density.

Coloring Material (Coloring Agent)

It is possible to use, for example, the described constituent materials of the above-described first ink composition as the coloring material that configures the second ink composition. The coloring material that configures the second ink composition may be different from the coloring material that configures the first ink composition; however, it is preferable that the coloring material be the same as the coloring material that configures the first ink composition.

It is preferable that the content rate of the coloring material in the second ink composition be from 0.1 mass % or more to 3 mass % or less, and 0.2 mass % or more to 2 mass % or less is more preferable. When the content rate of the coloring material is a value in this range, along with it being possible for both discharge stability using an ink jet method and image density in the printing portion to be at a higher level, fine colors that are difficult to express with the first ink composition alone become reproducible, and it is possible for the granularity of the image overall to be reduced. Moreover, in a case in which the second ink composition includes a plurality of types of coloring material, it is preferable that the sum total of these content rates be included in these ranges.

Alkane Diol

By the second ink composition including an alkane diol with 4 or more to 8 or fewer carbon atoms, it is possible for the penetration of the first ink composition in the recording medium to be more favorable, possible to more effectively prevent the occurrence of bleeding, and the image quality of the printed portion further improves.

It is preferable that the content rate of the alkane diol in the second ink composition be from 2 mass % or more to 10 mass % or less, and 4 mass % or more to 8 mass % or less is more preferable. In so doing, the effect in which bleeding is prevented, the printed portion has sufficient image density, and a recorded matter with a texture such as that of a picture (mural) drawn on plaster is provided is obtained. In contrast, when the content rate of the alkane diol is less than the lower limit value, there is a possibility of the problem of bleeding of the ink on the medium and aggregation of the pigment occurring. In addition, when the content rate of the alkane diol exceeds the upper limit value, the tendency for the discharge stability using an ink jet method to lower becomes remarkable. Moreover, in a case in which the second ink composition includes a plurality of types of alkane diol, it is preferable that the sum total of these content rates be included in these ranges.

Water-Soluble Solvent

The second ink composition includes a water-soluble solvent. In so doing, an effect in which drying of the ink in the head is suppressed and the reliability may be improved is obtained.

Moreover, in the aspect of the invention, it is possible to use a water-soluble solvent other than an alkane diol with 4 or more to 8 or fewer carbon atoms as the water-soluble solvent, and examples thereof include, for example, glycerin, diethylene glycol, triethylene glycol, tetraethylene glycol, hexaethylene glycol, propylene glycol, dipropylene glycol, 1,3-propanediol, 1,4-butanediol, 1,5-pentanediol, 1,6-hexanediol, 3-methyl-1,3-butanediol, 2-methyl-1,3-propanediol, 3-methyl-1,5-pentanediol, 2-pyrrolidone, and N-methyl pyrrolidone.

Among these, a second ink composition including an alkylene glycol alkyl ether represented by the following formula (2) is preferable. In addition, the favorable alkylene glycol alkyl ether is the same as described for the above first ink composition.

It is preferable that the content rate of the water-soluble solvent in the second ink composition be from 5 mass % or more to 30 mass % or less, and 10 mass % or more to 27 mass % or less is more preferable. In so doing, the effect in which drying of the ink in the head is suppressed and the reliability may be improved is obtained. In contrast, when the content rate of the water-soluble solvent is less than the lower limit value, there is a possibility of the problem of ink drying in the head and becoming unable to be discharged, the weight of the droplets discharged being unstable or the landing position shifting occurring. In addition, when the content rate of the water-soluble solvent exceeds the upper limit value, the tendency for the discharge stability using an ink jet method of the first ink composition to lower becomes remarkable. Moreover, in a case in which the first ink composition includes a plurality of types of water-soluble solvent, it is preferable that the sum total of these content rates be included in these ranges.

Water

The second ink composition includes water. The preferable content amount and the like are the same as the first ink composition disclosed above.

Other Components

The second ink composition may include components (other components) other than described above.

As such components, for example, it is possible to use the constituent components of the first ink composition described.

It is preferable that the viscosity (viscosity at 25° C.) of the second ink composition be from 2 mPa·s or more to 20 mPa·s or less. In so doing, it is possible for the discharge stability of the second ink composition (such as stability of discharge amount, flight characteristics of droplets), discharge responsiveness (such as response speed, high frequency correspondence (frequency response characteristics)) to be particularly superior.

In the ink jet recording method of the aspect of the invention, a plurality of types of second ink composition may be used. For example, a plurality of types of second ink composition with different colors (plurality of types of second ink composition for which the type of coloring material contained is different) is preferably used.

Recording Medium

As described above, the recording medium according to the aspect of the invention has an absorbing layer on the surface thereof.

The nonpolar component $\gamma sd$ of the surface free energy of the absorbing layer calculated with the above formula (1) is 20 mN/m or lower, and 5 mN/m or more to 20 mN/m or less is preferable. If using an ink composition as described above, favorable image recording is possible even on such a recording medium.

The nonpolar component $\gamma sp$ of the surface free energy of the absorbing layer calculated with the above formula (1) is 20 mN/m or lower, and 0.1 mN/m or more to 10 mN/m or less is preferable. In so doing, a recorded matter with a higher texture may be obtained, and favorable image recording may be performed even on such a recording medium if an ink composition as described above is used.

Although the absorbing layer of the recording medium may be configured from any material if satisfying the conditions of the nonpolar component $\gamma sd$ of surface free energy described above, one or more types selected from calcium carbonate, clay, talc, kaolin, and metal hydroxide are preferable, and metal hydroxide is more preferable.

Examples of the metal hydroxide configuring the absorbing layer include, for example, aluminum hydroxide, calcium hydroxide, magnesium hydroxide, and zinc hydroxide; however, among these, calcium hydroxide is preferable. In so doing, it is possible for the texture such as a picture (mural) drawn on plaster to be further improved. In addition, the coloring material is protected by the absorbing layer partially changing after recording, and it is possible for the light resistance to be made further superior.

It is preferable that the metal hydroxide configuring the absorbing layer be formed to be granular. In so doing, it is possible for the texture such as a picture (mural) drawn on plaster to be further improved. In addition, it is possible for the light resistance of the recorded matter to be made further superior.

It is preferable that the content rate of the metal hydroxide in the absorbing layer be 20 mass % or more with respect to the total mass of the absorbing layer, 20 mass % or more to 90 mass % or less is more preferable, and 30 mass % or more to 80 mass % or less is still more preferable. In so doing, it is possible for the texture such as a picture (mural) drawn on plaster to be further improved. In addition, it is possible for the light resistance of the recorded matter to be made further superior.

In addition, it is preferable that the average particle size of the metal hydroxide configuring the absorbing layer be from 0.2 μm or more to 10 μm or less, and 0.4 μm or more to 7 μm or less is more preferable. In so doing, it is possible for the texture such as a picture (mural) drawn on plaster to be further improved. In addition, it is possible for the light resistance of the recorded matter to be made further superior.

It is preferable that the thickness of the absorbing layer be from 50 μm or more to 1000 μm or less, and from 100 μm or more to 800 μm or less is more preferable. In so doing, it is possible for the texture such as a picture (mural) drawn on plaster to be further improved. In addition, it is possible for the light resistance of the recorded matter to be made further superior.

Although the recording material may be configured by only the absorbing layer as described above, it is preferable that the absorbing layer be provided on a base material that holds the absorbing layer. In so doing, the stability of shape and transportability of the recording medium improve, and it is possible for the productivity of the recorded matter, and the reliability of the manufactured recorded matter to be particularly superior.

Although the base material may be configured of any material, it is preferable that a fabric composed of fiber-like materials such as paper, glass fiber, vinylon fiber, polypropylene fiber, polyester fiber, polyethylene terephthalate fiber, acrylic fiber, aramide fiber and carbon fiber, or a non-woven fabric be used.

In addition, the absorbing layer may contain as necessary resin particles, polycrystalline silica, porous silicate, weak acid salts or oxide of bivalent metals such as magnesium or zinc, natural or synthetic zeolite, alumina, diatomaceous earth, synthetic mica, various clays, talc, calcium carbonate, kaolin, acid clay, and activated clay.

The absorbing layer may have a cracking region (cracking) that spans from the surface thereof to the base material. Although there are cases in which the recording medium disclosed above has such cracking, if the invention of the present application is used, recording a good image is possible even on such a recording medium. In addition, bleeding is effectively prevented, and a printed matter having a printing portion with a sufficient image density, and with a texture such as that of a picture (mural) drawn on plaster may be provided.

Recording Material

Next, the recorded matter of an aspect of the invention will be described.

The recorded matter of the aspect of the invention is manufactured using the above-described ink jet recording method.

In so doing, a recorded matter in which a recording medium in which a nonpolar component of the surface free energy is low is used, and having a printing portion in which bleeding is prevented may be provided.

Above, the invention has been described based on preferred embodiments; however, the invention is not limited thereto.

EXAMPLES (1) Manufacturing of Recording Material

Example 1

First, the ink composition (first ink composition) is prepared as below.

Water, C.I. Pigment Blue 15:3 (average particle size: 100 nm) as a resin dispersed pigment, resin particles (glass transition point: 20° C., average particle size: 100 nm) configured by a styrene-acrylic copolymer, 1,2-hexanediol as the alkane diol with 4 or more to 8 or fewer carbon atoms, glycerin, and triethanolamine as amine derivative were mixed, and an ink composition (first ink composition) was obtained.

Next, the ink composition (first ink composition) prepared as above was filled in the interior of a discharge head (resolution per unit length: 360 dpi) using a piezoelectric element attached to an ink jet recording method printer PX-G930 (manufactured by Seiko Epson). After filling, the ink composition is applied with respect to the recording medium described in Table in a predetermined pattern, and a recorded matter is obtained.

Moreover, the recording medium A below is used as the recording medium.

Figure 5:
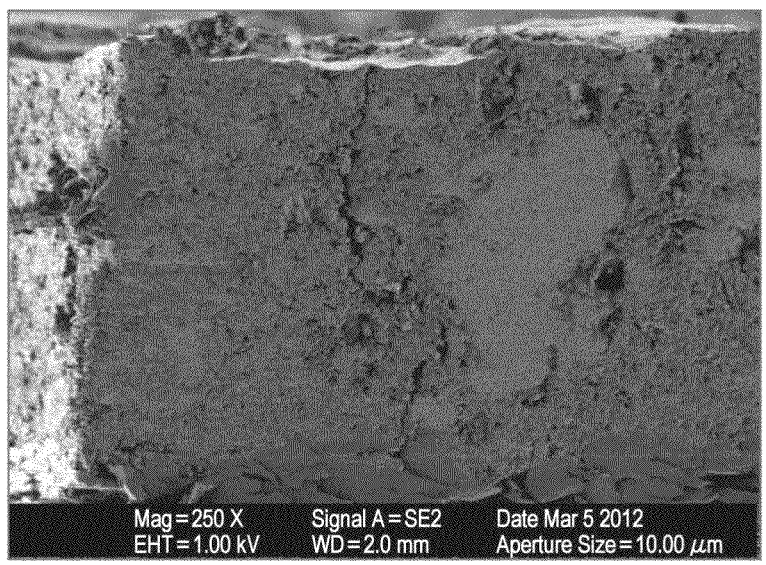
FIG. 5 is a scanning electron microscope (SEM) photograph of a vertical cross-section of the absorbing layer of a recorded matter used in Example 1.

The recording medium A has an absorbing layer formed by coating a coating material including calcium hydroxide (average particle size: 1 μm) as inorganic particles on a glass fiber mixed paper as a base material. Calcium hydroxide is 50 mass % with respect to the total mass of the absorbing layer. In addition, the absorbing layer may have a cracking region (cracking) that spans from the surface thereof to the base material. A scanning electron microscope (SEM) photograph of a vertical cross-section of the absorbing layer of the recording medium used in the present example is shown in FIG. 5. Moreover, the nonpolar component $\gamma sd$ of the surface free energy of the recording medium A is 15.4 mN/m, and the polar component $\gamma sp$ of the surface free energy is 0.3 mN/m.

Examples 2 to 10

By adjusting the type and usage amount of the components used in the preparation of the ink composition, the constitutions shown in Table were prepared and further, other the using the recording medium shown in Table, a recorded matter was manufactured similarly to Example 1.

Moreover, recording medium B is a film-based matte paper (MC Matte Synthetic Paper, manufactured by Seiko Epson) including an absorbing layer, the nonpolar component $\gamma sd$ of the surface free energy is 19.6 mN/m, and the polar component $\gamma sp$ of the surface free energy exceeds 20 mN/m.

Recording medium C is a recording paper (Xerox 4200, manufactured by Xerox), the nonpolar component $\gamma sd$ of the surface free energy is 26.3 mN/m, and the polar component $\gamma sp$ of the surface free energy is 0.3 mN/m.

Recording medium D is a recording paper (Xerox P, manufactured by Xerox), the nonpolar component γsd of the surface free energy is 38.2 mN/m, and the polar component γsp of the surface free energy is 3.7 mN/m.

"CB" indicates carbon black, and is a self-dispersion pigment in which a carboxyl group is introduced in the surface thereof.

Example 11

In Example 11, the ink composition disclosed in Example 1 was used as the first ink composition, and furthermore, outside of use together with the ink composition disclosed in Example 4 as the second ink composition, a recorded matter was prepared similarly to Example 1.

Comparative Examples 1 to 4, Reference Examples 1 and 2

Other than using the ink composition and recording medium as shown in Table, the recorded matter is manufactured in the same manner as Example 1.

Moreover, in the table, C.I. Pigment Blue 15:3 is represented by "PB15:3" and carbon black by "CB", an styrene-acrylic copolymer by "St-Ac", 1,2-hexanediol as an alkane diol with 4 or more to 8 or fewer carbon atoms by "1,2-HD", 1,2-pentanediol by "1,2-PD", the alkylene glycol alkyl ether in formula (2) for which $R^1$ is an n-butyl group, $R^2$ is a hydrogen atom, n is 3, and k is 0 by "GE1", the alkylene glycol alkyl ether of formula (2) for which $R^1$ is a methyl group, $R^2$ is a methyl group, n is 1, and k is 0 by "GE2", the alkylene glycol alkyl ether of formula (2) for which $R^1$ is an n-hexyl group, $R^2$ is a hydrogen atom, n is 4, and k is 0 by "GE3", and the alkylene glycol alkyl ether of formula (2) for which $R^1$ is an n-butyl group, $R^2$ is a hydrogen atom, n is 3, and k is 1 by "GE4", glycerin by "GL", and triethanolamine by "TEA".

Moreover, the viscosity (viscosity obtained by JIS Z8809 compliant measurement using a vibration-type viscometer) at 25° C. of the ink compositions (first ink composition and second ink composition) used in each of the examples falls in a range of 2 mPa·s or more to 20 mPa·s or less. In addition, the average particle size may be obtained by measurement using a particle size analyzer (Microtrac UPA, manufactured by Nikkiso Co., Ltd.).

TABLE

| | Constitution of Ink Composition | | | | | | | | | |
|---|---|---|---|---|---|---|---|---|---|---|
| | Coloring Material | | Alkane Diol | | Water-Soluble Solvent | | Water Content | Other Components | | |
| | Type | Content Rate (Parts by Mass) | Type | Content Rate (Parts by Mass) | Type | Content Rate (Parts by Mass) | Rate (Parts by Mass) | Type | Content Rate (Parts by Mass) | Recording Medium | Bleeding |
| Example 1 | PB15:3 | 4 | 1,2-HD | 2 | GL | 15 | 76.8 | St-Ac-/TEA | 1.2/1.0 | A | B |
| Example 2 | PB15:3 | 4 | 1,2-HD | 5 | GL | 10 | 78.8 | St-Ac-/TEA | 1.2/1.0 | A | A |
| Example 3 | PB15:3 | 4 | 1,2-HD | 7 | GL | 5 | 81.8 | St-Ac-/TEA | 1.2/1.0 | A | A |
| Example 4 | PB15:3 | 1 | 1,2-HD | 7 | GL | 20 | 70.7 | St-Ac-/TEA | 0.3/1.0 | A | A |
| Example 5 | PB15:3 | 1 | 1,2-HD | 10 | GL | 13 | 74.7 | St-Ac-/TEA | 0.3/1.0 | A | A |
| Example 6 | PB15:3 | 4 | 1,2-HD | 2 | GE1/GL | 2.0/12.0 | 77.8 | St-Ac-/TEA | 1.2/1.0 | A | A |
| Example 7 | PB15:3 | 4 | 1,2-HD | 2 | GE2/GL | 2.0/12.0 | 77.8 | St-Ac-/TEA | 1.2/1.0 | A | A |
| Example 8 | PB15:3 | 4 | 1,2-HD | 5 | GL | 15 | 76.8 | St-Ac-/TEA | 1.2/1.0 | A | B |
| Example 9 | PB15:3 | 4 | 1,2-HD | 2 | GL | 15 | 76.8 | St-Ac-/TEA | 1.2/1.0 | B | A |
| Example 10 | CB | 4 | 1,2-HD | 5 | GL | 15 | 78.8 | St-Ac-/TEA | 1.2/1.0 | A | A |
| Example 11 First Ink Composition | PB15:3 | 4 | 1,2-HD | 2 | GL | 15 | 76.8 | St-Ac-/TEA | 1.2/1.0 | A | A |
| Second Ink Composition | PB15:3 | 1 | 1,2-HD | 7 | GL | 20 | 70.7 | St-Ac-/TEA | 0.3/1.0 | | |
| Comparative Example 1 | PB15:3 | 4 | — | — | CE1/GL | 2.0/12.0 | 77.8 | St-Ac-/TEA | 1.2/1.0 | A | C |
| Comparative Example 2 | PB15:3 | 4 | — | — | CE3/GL | 2.0/12.0 | 79.8 | St-Ac-/TEA | 1.2/1.0 | A | C |
| Comparative Example 3 | PB15:3 | 4 | — | — | CE4/GL | 2.0/12.0 | 79.8 | St-Ac-/TEA | 1.2/1.0 | A | C |
| Comparative Example 4 | PB15:3 | 4 | — | — | CE1/GL | 2.0/12.0 | 79.8 | St-Ac-/TEA | 1.2/1.0 | B | C |
| Reference Example 1 | PB15:3 | 4 | — | — | CE1/GL | 2.0/12.0 | 79.8 | St-Ac-/TEA | 1.2/1.0 | C | A |
| Reference Example 2 | PB15:3 | 4 | — | — | CE1/GL | 2.0/12.0 | 76.8 | St-Ac-/TEA | 1.2/1.0 | D | A |

(2) Evaluation (2.1) Bleeding in Printing Portion

The printed portion of the recorded matter of each example and comparative example was evaluated for unwanted bleeding using the criteria below.

A: no bleeding and density variations, satisfactory image obtained
B: slight bleeding occurs
C: whisker-like bleeding occurs The results of the evaluation are combined and shown in Table.

(2.2) Light Resistance

Recorded matters manufactured using the conditions shown in each of the examples and comparative examples were prepared two at a time. Each was irradiated with ultraviolet rays with an intensity of 500 μW/cm² using an ultraviolet irradiation fluorescent lamp ("Neo Lumi Super" manufactured by Mitsubishi Electric Corp., Model: FL30SBL-360), and the remaining sheet was stored in a dark place. The sample irradiated with ultraviolet rays for 3 months and the sample stored in a dark location for 3 months were removed, and the color difference (ΔE) in yellow of the L*, a*, b* color system between the ultraviolet irradiated portion and the unirradiated portion was obtained using a spectrum color-difference meter (Handy Easy Spectrophotometer manufactured by Nippon Denshoku Industries, model number: NF-333) with JIS Z8730 as a standard. As a result, low value approximately 7 for ΔE was obtained by comparing the recorded matter using the recording medium A and a recorded matter using another recording medium.

(2.3) Texture

The texture of the recorded matter of each of the examples and comparative examples was evaluated. As a result, the recorded matter using the recording medium A and another recording matter were compared and a recorded matter having a superior texture such as a picture (mural) drawn on plaster was satisfactory.

According to the above results, in contrast to the satisfactory results obtained in the aspect of the invention, satisfactory results were not obtained in the comparative examples. In addition, in Example 11, by combined use with the ink composition (second ink composition) of Example 4, bleeding of the printed portion in which the ink composition (first ink composition) of the Example 1 is used is improved, and a more satisfactory recorded matter was obtained.

What is claimed is:

1. An ink jet recording method comprising discharging a first ink composition onto a recording medium using a recording head,
    wherein the first ink composition includes a coloring material, an alkane diol with 4 or more to 8 or fewer carbon atoms, a water-soluble solvent, and water,
    the recording head discharges the first ink composition using a piezoelectric element, and has a resolution per unit length of 200 dpi or more,
    the recording head performs recording of an image using droplets of 5 pl or more to 15 pl or less, and
    the recording medium has an absorbing layer on the surface thereof, in which a nonpolar component γsd of a surface free energy of the absorbing layer calculated using the following formulae (1) and (2) is 20 mN/m or lower, $$\gamma l_M(1+\cos\theta_M)=2(\gamma sd\cdot\gamma ld_M)^{0.5}+2(\gamma sp\cdot\gamma lp_M)^{0.5} \quad (1)$$

$$\gamma l_W(1+\cos\theta_W)=2(\gamma sd\cdot\gamma ld_W)^{0.5}+2(\gamma sp\cdot\gamma lp_W)^{0.5} \quad (2)$$

(where, in formulae (1) and (2), $\gamma ld_M$ represents a nonpolar component of a surface free energy of diiodomethane, $\gamma lp_M$ represents a polar component of a surface free energy of diiodomethane, $\gamma l_M$ represents a surface free energy of diiodomethane (=γld+γlp), $\theta_M$ represents a contact angle of diiodomethane on the absorbing layer, $\gamma ld_W$ represents a nonpolar component of a surface free energy of water, $\gamma lp_W$ represents a polar component of a surface free energy of water, $\gamma l_W$ represents a surface free energy of water (=γld+γlp), $\theta_W$ represents a contact angle of water on the absorbing layer, γsd represents a nonpolar component of a surface free energy of the absorbing layer, and γsp represents a polar component of a surface free energy of the absorbing layer).

2. The ink jet recording method according to claim 1, wherein a polar component of a surface free energy of the absorbing layer calculated with the formula (1) is 20 mN/m or lower.

3. The ink jet recording method according to claim 1, wherein a second ink composition containing a coloring material with the same color as the first ink composition contains coloring material in which the content rate of a color material is lower than the content rate of the color material in the first ink composition and including an alkane diol with 4 or more to 8 or fewer carbon atoms at a content rate of 1 mass % or higher to 10 mass % or lower is used along with the first ink composition.

4. The ink jet recording method according to claim 1, wherein the absorbing layer includes a metal hydroxide.

5. The ink jet recording method according to claim 1, wherein the first ink composition includes an alkylene glycol alkyl ether represented by the following formula (3),

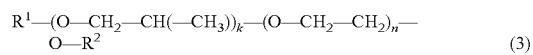

(3)

(where, in formula (3), $R^1$ and $R^2$ each independently represent a hydrogen atom or an alkyl group with 1 or more to 4 or fewer carbon atoms, n is a number of 0 or higher and 3 or less, k is a number of 0 or higher and 3 or less, $R^1$ and $R^2$ are not hydrogen atoms at the same time, and n and k are not 0 at the same time).

6. The ink jet recording method according to claim 1, wherein the absorbing layer is provided on a base material, and has a cracking region that spans from the surface thereof to the base material.

* * * * *